March 6, 1951 W. H. HILL 2,543,969
NEUTRAL SELECTING MECHANISM FOR CHANGE-SPEED GEAR BOXES
Filed Feb. 2, 1949 3 Sheets-Sheet 1

INVENTOR
WILLIAM HENRY HILL
By
ATTORNEY.

March 6, 1951 W. H. HILL 2,543,969
NEUTRAL SELECTING MECHANISM FOR CHANGE-SPEED GEAR BOXES
Filed Feb. 2, 1949 3 Sheets-Sheet 2

INVENTOR
WILLIAM HENRY HILL
By [signature]
ATTORNEY.

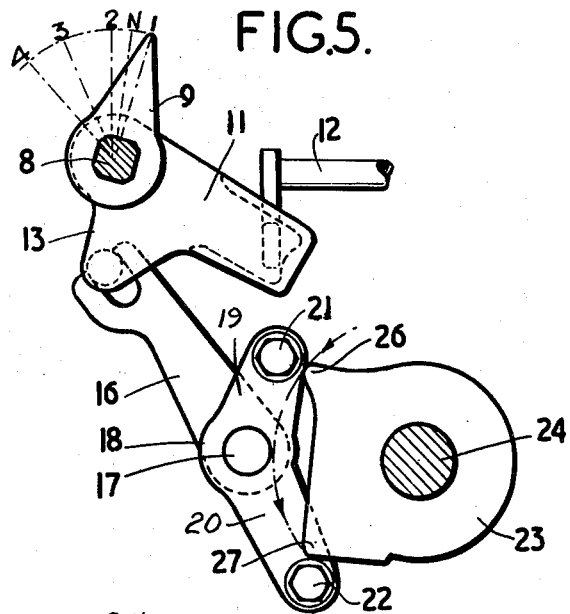
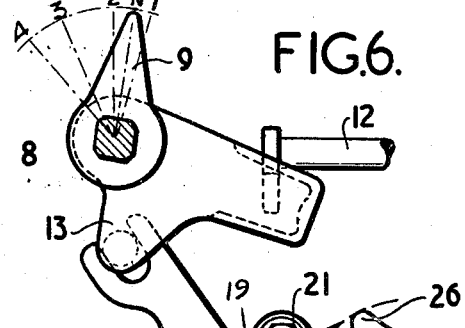
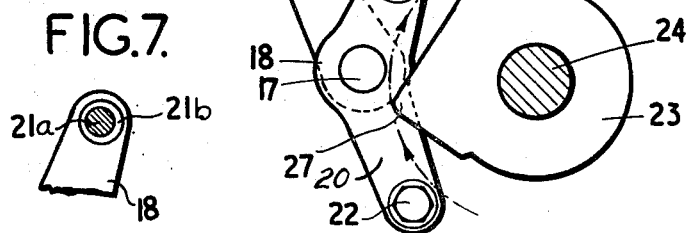

Patented Mar. 6, 1951

2,543,969

UNITED STATES PATENT OFFICE 2,543,969

NEUTRAL SELECTING MECHANISM FOR CHANGE-SPEED GEAR BOXES

William H. Hill, Birmingham, England

Application February 2, 1949, Serial No. 74,123
In Great Britain February 6, 1948

7 Claims. (Cl. 74—474)

This invention has reference to motorcycle and like gear boxes of the type wherein a rotatable gear selecting shaft is movable for engaging a gear or for selecting neutral, by an angularly displaceable foot or hand actuated lever acting through a ratchet mechanism.

In boxes of this type the lever is normally spring retained in a central or intermediate position from which it is angularly displaced, in either direction, for operating the ratchet mechanism and imparting a rotary movement to the gear selecting shaft and is automatically returned to the said initial and central position by spring action after each displacement preparatory to imparting a further shaft-turning operation to the ratchet mechanism. Hence, if the lever is given a plurality of foot or hand initiated angular movements in the same direction, the gear-selecting shaft is turned step-by-step away from its neutral selecting position to engage successive gears.

Consequently, before neutral can again be selected, it is necessary to give to the lever the same number of angular movements in the opposite direction from its central or intermediate position, and the time taken for these movements is likely to be inconvenient or even dangerous if neutral is required quickly, for example, should an emergency arise.

The principal object of the present invention is to provide new or improved neutral selecting mechanism which enables the neutral setting of a gear box to be obtained instantaneously no matter in which direction of rotation the gear selecting shaft has been turned from its neutral selecting position.

A further object of the invention is to enable the gear box of a motorcycle to be set in its neutral position by the kick-starter lever of the cycle so that the engine with which the gear box is associated cannot be started up by the kick-starter with a gear engaged.

These and other objects and advantages of the invention will become apparent from a consideration of the following description and the accompanying drawings wherein there is specifically disclosed and illustrated a preferred embodiment of the invention.

In the drawings:

Figure 5 is an elevation showing the gear selecting shaft and the crank plate in the positions they assume when bottom gear of the box has been engaged, the cam plate being shown partially rotated and about to return the said shaft and crank plate to their neutral positions.

Figure 6 is a similar view to Figure 5 showing the gear selecting shaft and the crank plate in their neutral positions and the cam plate in the position which it normally assumes, and Figure 7 is a sectional elevation of a detail of construction.

Figure 1:
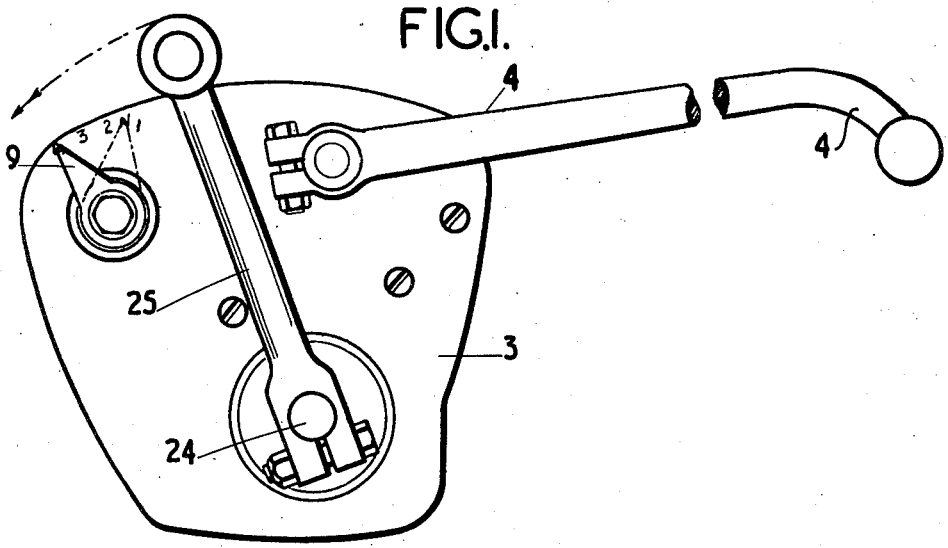
Figure 1 is an elevation of a gear box fitted with a gear selecting lever and a kick starter.

The front wall 2 of the gear box 1 is removable from the box and has a cover 3 detachably assembled to its outer face.

The gear-selecting lever 4 is non-rotatably mounted on and detachably assembled to the outer end of a shaft 5 which is journalled in the cover, the inner end of the said lever having a radial arm 6 secured thereto. The said arm is operatively connected to a ratchet mechanism 7 (of any known and suitable construction) through which drive is transmitted by the lever 4 to a gear-selecting shaft 8 journalled in the wall 2 and extending into the interior of the box 1.

Figure 2:
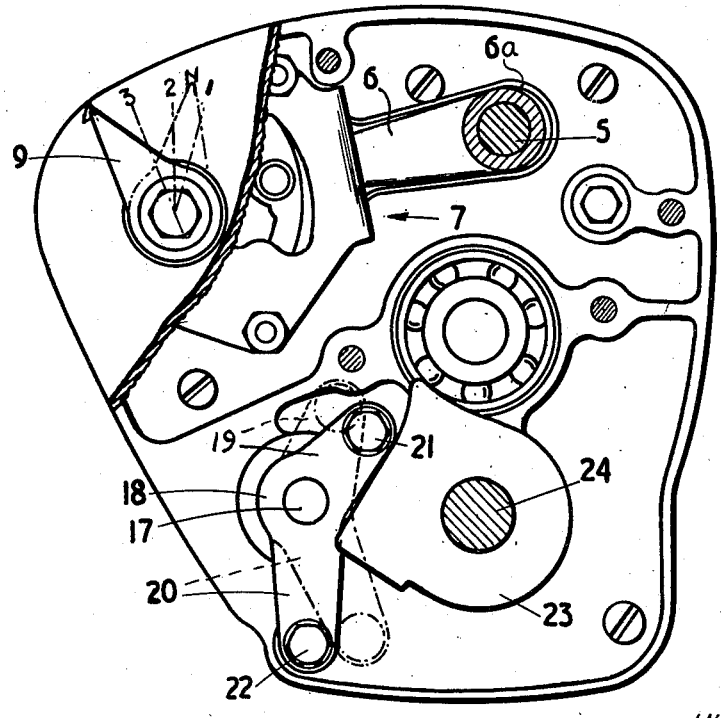
Figure 2 is an elevation, on a larger scale, of the box shown in Figure 1, the cover being partly broken away and the gear selecting and kick-starter levers being removed.
Figure 3:
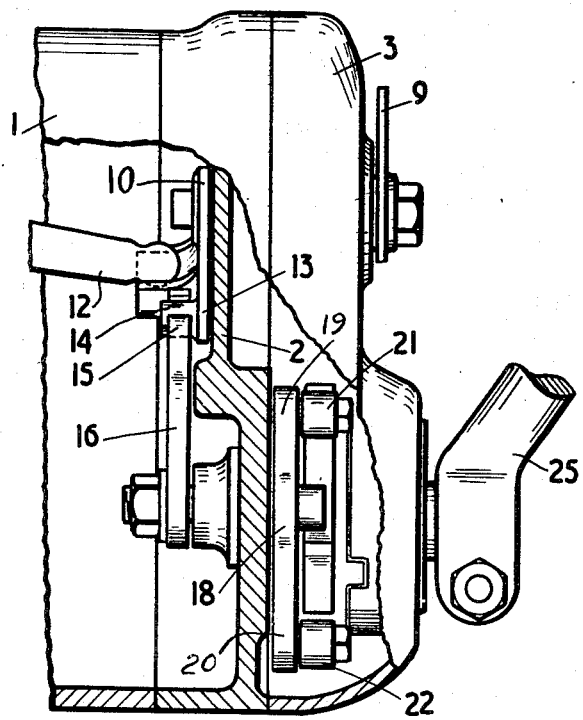
Figure 3 is a side elevation, partly in section, of Figure 2.
Figure 4:
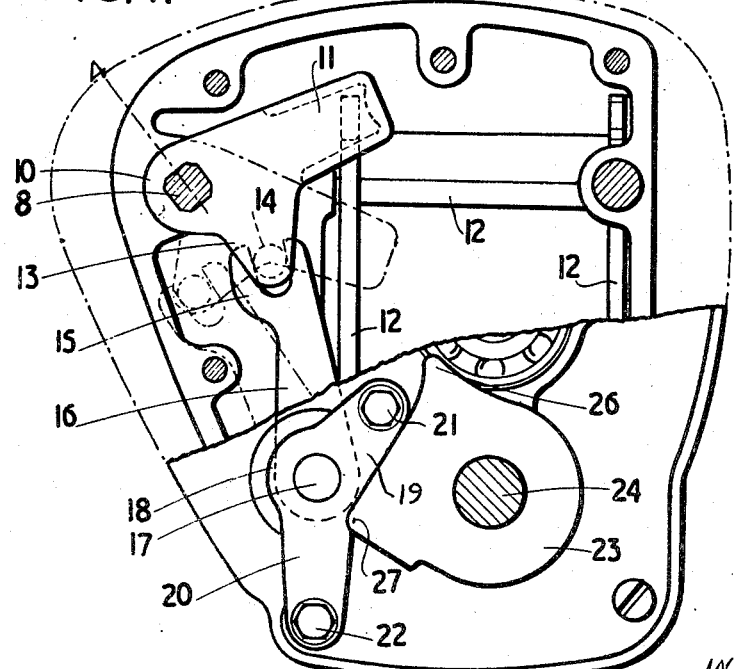
Figure 4 is a similar view to Figure 2 showing the cover of the box wholly removed and the adjacent wall of the box partly broken away.

The arm 6 is embraced by a spring 6a which, after each foot or hand initiated movement of the gear lever 4 in either direction about the axis of the shaft 5, returns the arm, shaft and lever to their normal initial central or intermediate positions shown in Figures 1 and 2. The shaft 8 also projects through the ratchet mechanism to the outside of the cover 3 and, externally of the cover has a pointer 9 secured thereto; the pointer serves for giving a visual indication as to whether the gear wheels (not shown) within the box are in neutral or in gear and, if so, which gear is engaged by registration with the letter "N" or the numbers 1–4 which are marked upon the outside of the cover. Thus, it will be seen that, in Figures 1, 2 and 4, the fourth or top gear has been engaged.

A bell-crank-like lever 10 is rigidly secured to the end of the gear selecting shaft which projects into the interior of the box 1, the arm 11 of the said lever being coupled to a rocker 12 which is adapted to effect the actual engagement and disengagement of the gears, as is well known; the other arm of the bell crank lever is in the form of a projection 13 and has a stud 14 mounted on its free end.

The bifurcated or forked end 15 of an arm 16 extending radially and rigidly from an intermediate shaft 17 journalled in and projecting through the wall 2, engages the stud 14 on the projection from the bell crank lever 10; hence any rotary movement imparted to the gear-selecting shaft 8 by the ratchet mechanism 7, is transmitted to the auxiliary shaft through the bell-crank lever 10 and the arm 16; similarly, any rotary movement imparted to the auxiliary shaft is transmitted to the gear-selecting shaft.

To the outer end of the intermediate shaft, which is located between the wall 2 and cover 3, there is secured a crank plate 18 which comprises relatively inclined arms 19 and 20 which respectively extend upwardly and downwardly of the intermediate shaft. A stud 21 and 22 is provided on the arms 19 and 20 respectively, the said studs being located adjacent the free ends and extending forwardly (that is, towards the cover 3) of the arms into the plane of a cam plate 23 which is secured to the usual kick-starter shaft 24 of the gear box.

To enable the studs 21 and 22 to be adjusted relatively to the cam plate 23, each stud comprises (see Figure 7) a bolt 21a around which an eccentric sleeve 21b is mounted. Normally, the sleeve is gripped securely between the bolt head and the complementary arm of the crank plate but if the bolt is slackened, the sleeve may be rotated upon the latter to vary, within fine limits, the distance between the stud and the periphery of the cam plate.

The shaft 24 projects to the outside of the cover 3 and has the usual kick-starter lever 25 removably secured to its outer end.

The cam plate is formed upon its periphery with two noses or cams 26 and 27, the tips of which are located equidistantly from the axis of the shaft 24.

When the crank-plate and gear selecting shaft are located in their neutral selecting positions (as shown in Figure 6), the tips of the noses or cams 26, 27, move along a path which clears both the studs 21 and 22, when the kick starter shaft and cam plate are rotated. However, as the gear-selecting shaft is turned from its neutral position (see Figure 6) to engage second, third or fourth gear, the crank-plate is turned through a corresponding amount to move the crank-plate arm 19 towards the cam plate; similarly, as the gear-selecting shaft is turned from its neutral position in the opposite direction, to engage first or bottom gear (see Figure 5), the arm 20 of the crank plate is moved towards the cam plate. Consequently, when one of the higher gears is engaged, rotation of the cam-plate anti-clockwise, causes the nose or cam 26 to abut and ride over the stud 21 and, in so doing, to return the crank-plate to its neutral position. Since any rotary movement imparted to the crank plate is transmitted to the intermediate shaft 17 and, from the latter, to the gear selecting shaft 8, it follows that the rotation of the kick-starter shaft also returns the said shaft 8 to its neutral or neutral selecting position. Consequently, no matter which of the four gears of the box is engaged, rotation of the kick-starter shaft automatically returns the box to neutral.

The location of the intermediate shaft and the crank plate close to the periphery of the cam plate, and the provision of the latter plate with two circumferentially spaced noses or cams, ensures that no matter which of the four gears is selected, neutral conditions can be set up in the box 1 by a fraction of a rotation of the kick-starter shaft anti-clockwise. The arrangement is such that this fractional movement is completed before the kick-starter lever and shaft are able to transmit starting drive to the engine with which the box 1 is associated or to which the said box is assembled. Consequently, neutral conditions can be set up whilst the engine is running; moreover, the setting up of such neutral conditions is automatically effected if an attempt is made to start up the engine whilst a gear is engaged since, before any drive can be transmitted to the engine by the kick-starter lever, the noses or cams 26 and 27 have impacted and travelled beyond the studs 21, 22.

It is desired to point out that before fourth or top gear can be engaged when the box is in neutral, it is necessary to impart three separate downward angular movements to the gear lever 4 since each time the said lever is depressed to actuate the ratchet mechanism 7 and impart gear-selecting rotary movement or step to the shaft 8, the lever must be returned to its initial central or intermediate position before a further sequence of operations can be carried out to engage a higher gear. Similarly, when the gear is engaged and neutral is required, this can be effected by the gear lever only imparting three successive upward angular movements thereto, to return the gear selecting shaft step-by-step to its neutral selecting position. When the gear lever is foot-operated, as is more general at the present time, considerable skill and care is required to set up neutral conditions in the box by means of the gear lever, particularly, for example, in case of an emergency, when it is desired to obtain neutral quickly. The neutral selecting mechanism hereinbefore described has the advantage that neutral conditions can be set up rapidly and positively without the exercise of any skill or care.

It should now be apparent that I have disclosed a neutral selecting mechanism for a change speed gear box which accomplishes the objects initially set forth. The gear box may be set in its neutral condition almost instantaneously no matter which of the four possible gears has been selected by the rotary movement of the gear selecting shaft, by a small and initial angular movement of the kick-starter lever, which angular movement is insufficient to effect any drive to the engine, should the latter be inoperative, or to make any connection between the engine crank shaft and the kick starter lever spindle should the engine be running. The mechanism required is simple in construction and necessitates the inclusion in the gear box of a minimum number of additional parts; also the neutral selecting mechanism can be added to a gear box without any substantial alteration in the appearance of the box, since all the additional parts that are necessary are housed between the cover plate and the adjacent wall of the gear box proper. The inclusion of the neutral selecting mechanism in the box does not call for the provision of any additional levers on the outside of the box which tend to give the box an untidy and unsightly appearance and which complicate the operation of the complete assembly by the driver of a motorcycle or other operative.

Whilst I have described and illustrated one specific embodiment of my invention, it is to be understood that various modifications may be made which are within the scope of the following claims. For example, if desired, an additional cam-plate carrying shaft and external lever may be provided for operating the crank plate and the latter may be located in some alternative position relatively to the gear-selecting shaft; thus, it is conceivable, for instance, that the crank plate may be carried upon the said gear selecting shaft.

Having described my invention, what I claim and desire to procure by Letters Patent is:

1. For a change speed gear box wherein a gear is selected by the partial rotation of a gear-selecting shaft, a neutral selecting mechanism comprising a crank plate journalled within the said box and having two lateral projections, the said projections being located on opposite sides of the axis of the said plate, means connecting said plate to said gear-selecting shaft so that rotary motion of the one is transmitted to the other, an auxiliary shaft journalled in and projecting to the outside of said box, an actuating lever operatively connected to the said auxiliary shaft externally of said box, and a cam plate secured to said auxiliary shaft internally of the box, the said cam plate being so located relatively to said projections that rotation of the auxiliary shaft brings a part of said cam plate into driving impact with one or other of said projections unless the gear selecting shaft and the crank plate are in their neutral positions.

2. For a change speed gear box wherein a gear is selected by the partial rotation of a gear-selecting shaft, a neutral selecting mechanism comprising a double-armed crank plate which is journalled in the said box, means connecting the crank plate to the said shaft whereby partial rotation of the one is transmitted to the other, a cam plate journalled within the box and located laterally of the said arms and means for rotating the said cam plate from the outside of the said box, the arrangement being such that rotation of the cam plate after a gear has been selected takes the said plate into impact with one or other of the said arms for driving the crank plate and therefore the gear selecting shaft to their neutral selecting positions.

3. For a change speed gear box wherein a gear is selected by the partial rotation of a gear-selecting shaft, a neutral selecting mechanism comprising an auxiliary shaft which is journalled in and projects to the outside of the said box, means located externally of the box for rotating said auxiliary shaft, an intermediate shaft journalled in the box and located parallel to the said auxiliary shaft, a crank plate fixed to said intermediate shaft, means connecting said crank plate to said gear selecting shaft whereby rotary movement imparted to the one is transferred to the other, and a cam plate secured on said auxiliary shaft and so arranged that, after the selection of a gear, partial rotation of the auxiliary shaft takes the said cam plate into driving impact with said crank plate to return the latter, and therefore the gear selecting shaft, to their neutral selecting positions.

4. For a change speed gear box wherein a gear is selected by the partial rotation of a gear-selecting shaft, a neutral selecting mechanism comprising an auxiliary shaft which is journalled in and projects to the outside of the said box, means located externally of the box for rotating said auxiliary shaft, an intermediate shaft journalled in the box and located parallel to said auxiliary shaft, a crank plate fixed to said intermediate shaft, two lateral projections on the said crank plate located one above and one below said intermediate shaft, a cam plate secured on said auxiliary shaft, the said cam plate and projections being located in a common plane and the cam plate having two cams on its edge adjacent said crank plate, the arrangement being such that upon the selection of a gear one or other of the said crank-plate projections moves into the path taken by one of the said cams when the said auxiliary shaft is partially rotated.

5. For a change speed gear box wherein a gear is selected by the partial rotation of a gear-selecting shaft and wherein an auxiliary shaft is journalled, said auxiliary shaft projecting to the outside of the box and having a kick-starting lever secured to its projecting end, a neutral selecting mechanism comprising a cam plate secured to and rotatable with said auxiliary shaft, two spaced cams on the edge of said cam plate, a crank plate journalled about an axis parallel to said auxiliary shaft, two projections on said crank extending into the plane of said cam plate, and means connecting said crank plate to said gear-selecting shaft so that rotational movement imparted to the one is transferred to the other, the arrangement being such that the selection of any gear causes one of said projections to move into the path of one of the said cams and partial rotation of said auxiliary shaft by said kick-starting lever brings the said one cam into driving impact with the said one projection to return said crank-plate and said gear-selecting shaft to their neutral selecting positions.

6. For a change speed gear box wherein a gear is selected by partial rotation of a gear-selecting shaft, a neutral selecting mechanism comprising an auxiliary shaft journalled in and extending to the outside of the said box, a kick-starting lever mounted on the external end of said auxiliary shaft, a cam plate secured to the said auxiliary shaft internally of the box and having two spaced cams on its edge, a double-armed crank plate secured to an intermediate shaft which is journalled in the said box and which is parallel to said auxiliary shaft, the said arms extending one upwardly and the other downwardly from said intermediate shaft, a stud on the end of each arm, the said studs extending into the plane of the said cam plate each in the vicinity of a corresponding cam on said cam plate, and means connecting said crank plate to said gear selecting shaft whereby rotary movement imparted to the one is transmitted to the other, the arrangement being such that upon selection of a gear one of said studs is moved into the path of the corresponding cam so that rotary movement imparted to the cam plate by the said kick starter lever takes the said cam into driving impact with said stud to return the crank lever and the gear selecting shaft to their neutral selecting positions.

7. For a change speed gear box wherein a gear is selected by partial rotation of a gear selecting shaft, a neutral selecting mechanism comprising a double-armed crank plate secured to an intermediate shaft journalled in said box, a bifurcated lever extending radially from said intermediate shaft, a radial extension from said gear selecting shaft, a stud on said radial extension engaged by said bifurcated lever so that rotary movement of said gear-selecting shaft is transmitted to said crank plate and vice versa, a cam plate journalled within the said box and located laterally of the arms of said crank plate, and means for rotating the said cam plate from the outside of the box, the arrangement being such that rotation of the cam plate after a gear has been selected takes said plate into impact with one or other of the said arms for driving the crank plate and therefore the gear-selecting shaft to their neutral selecting positions.

WILLIAM H. HILL.

REFERENCES CITED

The following references are of record in the file of this patent:

FOREIGN PATENTS

| Number | Country | Date |
| --- | --- | --- |
| 562,420 | Great Britain | June 30, 1944 |
| 583,084 | Great Britain | Dec. 6, 1946 |